US011756116B1

(12) United States Patent
Garner, IV et al.

(10) Patent No.: US 11,756,116 B1
(45) Date of Patent: Sep. 12, 2023

(54) WORKER SYNDICATE WITH GEOLOCATION-BASED FUNDING

(71) Applicant: Wells Fargo Bank, N.A., San Francisco, CA (US)

(72) Inventors: Andrew J. Garner, IV, State Road, NC (US); Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 8 days.

(21) Appl. No.: 17/147,247

(22) Filed: Jan. 12, 2021

(51) Int. Cl.
  *G06Q 40/03* (2023.01)
  *G06F 16/9537* (2019.01)
  (Continued)

(52) U.S. Cl.
  CPC ......... *G06Q 40/03* (2023.01); *G06F 16/9537* (2019.01); *G06Q 10/06312* (2013.01); *G06Q 20/14* (2013.01)

(58) Field of Classification Search
  None
  See application file for complete search history.

(56) References Cited

U.S. PATENT DOCUMENTS 4,633,397 A   12/1986   Macco
7,974,857 B1   7/2011   Fischer et al.
(Continued)

FOREIGN PATENT DOCUMENTS

WO   WO-2007017874 A2 *   2/2007   ............ G06Q 40/00
WO   WO-2021156879 A1 *   8/2021   ............ G06Q 20/20

OTHER PUBLICATIONS

H. Peng, "The Co-evolution of Chinese Peer-to-Peer Lending Industry and Regulation System," 2019 IEEE Technology & Engineering Management Conference (TEMSCON), 2019, pp. 1-6, doi: 10.1109/TEMSCON.2019.8813721. (Year: 2019).*

*Primary Examiner* — Gregory S Cunningham, II
(74) *Attorney, Agent, or Firm* — Foley & Lardner LLP

(57) ABSTRACT

A computer system for facilitating peer-to-peer anonymous lending between members of a business syndicate is disclosed. The system is structured to generate, by a disaster funding modeler circuit, based on disaster and economy data received from an external source, a projection of a need for a loan for a particular syndicate member located in a particular geographical area. The location of the syndicate member is determined based on member-provided information and/or based on global positioning system (GPS) information received from the member's computing device. This information is supplemented by additional information received from a municipality computer system (e.g., vehicle positioning information). The system is further structured to facilitate a peer-to-peer loan transaction. The system is further structured to generate further projections of conditions in the particular geographical area and, when the projections are indicative of worsening conditions, facilitate automatic loan repayment plan adjustment to an income-sensitive repayment plan.

20 Claims, 8 Drawing Sheets

(51) Int. Cl.
*G06Q 10/0631* (2023.01)
*G06Q 20/14* (2012.01)

(56) References Cited

U.S. PATENT DOCUMENTS

| | | |
|---|---|---|
| 8,606,603 B2 | 12/2013 | Annappindi |
| 11,282,135 B2 * | 3/2022 | Carroll .................. G06Q 50/01 |
| 2009/0150190 A1 | 6/2009 | Solomon et al. |
| 2012/0030082 A1 | 2/2012 | Voltz et al. |
| 2012/0158414 A1 | 6/2012 | Watford |
| 2013/0304659 A1 | 11/2013 | Toomey |
| 2017/0018030 A1 | 1/2017 | Crouspeyre et al. |
| 2017/0169508 A1 * | 6/2017 | Song ................... G06Q 20/223 |

* cited by examiner

WORKER SYNDICATE WITH GEOLOCATION-BASED FUNDING

TECHNICAL FIELD

The present disclosure relates to systems and methods for geolocation-based peer-lending in a business syndicate.

BACKGROUND

Businesses often have changing requirements regarding the number of employees needed at a time. These changes may be unpredictable due to outside factors, such as economic demand, local regulations, and local disasters. Due to these fluctuations in labor demand, businesses and employees both are at risk of fluctuations in income, which may make it difficult to cover expenses.

When an area is impacted by economic disaster-based hardships, the businesses and employees typically are also impacted by these hardships. Sometimes the geographical areas are determined by local health authorities for epidemic containment and population health management purposes. Geographical areas that are not impacted by hardships may be in a position to provide support to those who are impacted—for example, in the form of peer-to-peer loans. With disasters of a national scale (e.g., epidemics, pandemics, reoccurring economic shutdowns)—the loans may be made income-sensitive and, accordingly, repayment terms for such loans may need to be frequently adjusted and re-adjusted on short notice.

SUMMARY

At least one arrangement relates to a system for providing a loan to members of a business syndicate. The system comprises a requesting member computing device and a provider computing system. The requesting member computing device is associated with a requesting member of the business syndicate. The provider computing system comprises a network interface, a disaster funding modeler circuit, and a processing circuit. The network interface is structure to facilitate data communication with the requesting member computing device via a network. The processing circuit comprises a processor and a memory. The processing circuit is structured to receive an electronic request from the requesting member computing device. The electronic request comprises a requesting member data set related to the loan. Based at least on the electronic request, the processing circuit is further structured to determine a geolocation of the requesting member. Utilizing the geolocation, the processing circuit is further structured to query the disaster funding modeler circuit for a second data set and a third data set. The second data set comprises disaster and economy data for the geolocation. The third data set comprises disaster and economy data for the members of the business syndicate located outside of a predetermined distance from the geolocation. Based on the disaster and economy data, generate a requesting member local disaster data set and a request member local economy data set. Based on the requesting member data set, the requesting member local disaster data set, and the requesting member local economy data set, generate a requesting member risk rating. The processing circuit is further structured to, based on the third data set, generate a member local disaster data set and a member local economy data set for each of the members of the business syndicate. The processing circuit is further structured to, based on the member local disaster data set and the member local economy data set for each of the members of the business syndicate, select a plurality of prospective lender members. The processing circuit is further structured to transmit the electronic request, the requesting member local disaster data set, the requesting member local economy data set, and the requesting member risk rating to the plurality of prospective lender members. The processing circuit is further structured to receive an acceptance of the electronic request by the accepting member associated with one of the plurality of prospective lender members. The processing circuit is further structured to facilitate a transfer of an electronic payment from a financial account associated with the accepting member to a financial account associated with the requesting member.

Another arrangement relates to a method for providing a loan to members of a business syndicate. The method comprises receiving an electronic request from a requesting member computing device. The electronic request comprises a requesting member data set related to the loan. Based at least on the electronic request, the method further comprises determining a geolocation of the requesting member. Utilizing the geolocation, the method further comprises querying a disaster funding modeler circuit for a second data set and a third data set. The second data set comprises disaster and economy data for the geolocation. The third data set comprises disaster and economy data for the members of the business syndicate located outside of a predetermined distance from the geolocation. Based on the disaster and economy data, generate a requesting member local disaster data set and a request member local economy data set. Based on the requesting member data set, the requesting member local disaster data set, and the requesting member local economy data set, generate a requesting member risk rating. The method further comprises, based on the third data set, generating a member local disaster data set and a member local economy data set for each of the members of the business syndicate. The method further comprises, based on the member local disaster data set and the member local economy data set for each of the members of the business syndicate, selecting a plurality of prospective lender members. The method further comprises transmitting the electronic request, the requesting member local disaster data set, the requesting member local economy data set, and the requesting member risk rating to the plurality of prospective lender members. The method further comprises receiving an acceptance of the electronic request by an accepting member associated with one of the plurality of prospective lender members. The method further comprises facilitating a transfer of an electronic payment from a financial account associated with the accepting member to a financial account associated with the requesting member.

Another arrangement relates to a non-transitory computer readable medium having computer-executable instructions embodied therein that, when executed by at least one processor of a computing system, cause the computing system to perform operations to provide a loan to members of a business syndicate. The operations comprise receiving an electronic request from a requesting member computing device. The electronic request comprises a requesting member data set related to the loan. Based at least on the electronic request, the operations further comprise determining a geolocation of the requesting member. Utilizing the geolocation, the operations further comprise querying a disaster funding modeler circuit for a second data set and a third data set. The second data set comprises disaster and economy data for the geolocation. The third data set comprises disaster and economy data for the members of the business syndicate located outside of a predetermined distance from the geolocation. Based on the disaster and economy data, generate a requesting member local disaster data set and a request member local economy data set. Based on the requesting member data set, the requesting member local disaster data set, and the requesting member local economy data set, generate a requesting member risk rating. The operations further comprise, based on the third data set, generating a member local disaster data set and a member local economy data set for each of the members of the business syndicate. The operations further comprise, based on the member local disaster data set and the member local economy data set for each of the members of the business syndicate, selecting a plurality of prospective lender members. The operations further comprise transmitting the electronic request, the requesting member local disaster data set, the requesting member local economy data set, and the requesting member risk rating to the plurality of prospective lender members. The operations further comprise receiving an acceptance of the electronic request by an accepting member associated with one of the plurality of prospective lender members. The operations further comprise facilitating a transfer of an electronic payment from a financial account associated with the accepting member to a financial account associated with the requesting member.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
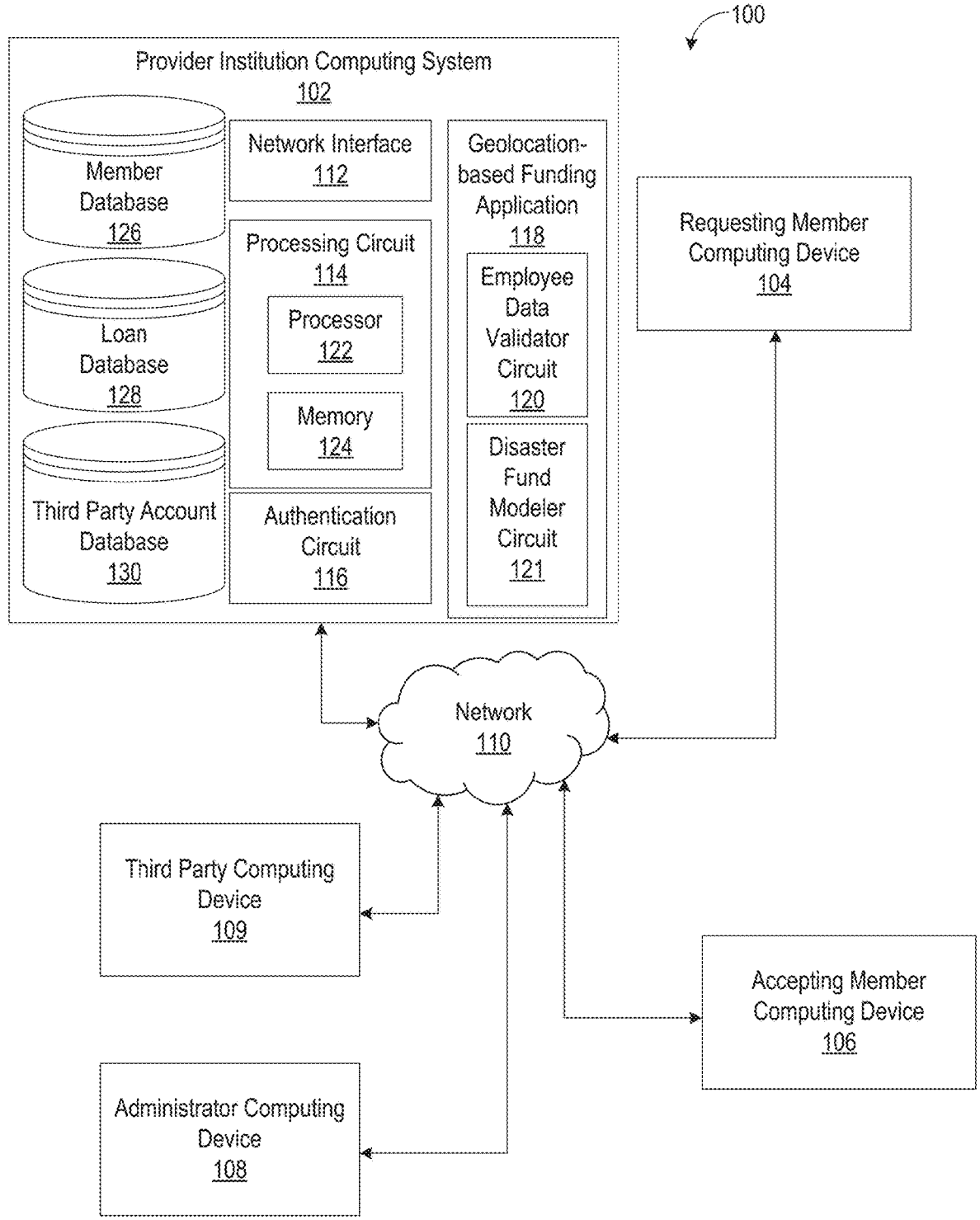
FIG. 1 is a component diagram of a geolocation-based funding system, according to an example arrangement.

Referring generally to the figures, systems and methods for facilitating peer-to-peer lending between members of a business syndicate are disclosed. An example computer system is structured to generate, by a disaster funding modeler circuit, based on disaster and economy data received from an external source, a projection of a need for a loan for a particular syndicate member located in a particular geographical area. The location of the syndicate member is determined based on member-provided information and/or based on global positioning system (GPS) information received from the member's computing device. This information is supplemented by additional information received from a municipality computer system (e.g., vehicle positioning information). The system is further structured to facilitate a peer-to-peer loan transaction. The system is further structured to generate further projections of conditions in the particular geographical area and, when the projections are indicative of worsening conditions, facilitate automatic loan repayment plan adjustment to an income-sensitive repayment plan.

The embodiments of the geolocation-based funding system as described herein improve geolocation-based, peer-lending technology by performing certain steps that cannot be done by conventional geolocation-based funding systems or human actors. For example, the geolocation-based funding system may generate a risk level rating and provide the risk level rating to other members of the business syndicate. The risk level rating may be generated based on disaster and economy data for a particular locality that corresponds to the location of the requesting member (e.g., local ordinances, local epidemiological data (number of reported cases in the locality, testing capacity in a locality) and the skill set of the requesting member to determine job demand in that locality). The members of the business syndicate may decide on whether to provide funds based on the generated risk level rating. The geolocation-based funding system may also generate a risk level rating for the members of the business syndicate so that the geolocation-based funding system may only provide the funds request to members having a lower risk level rating.

The requesting member may use the graphical user interfaces (GUI) generated by the systems described herein to specify a reason for requesting funds. The geolocation-based funding system may be structured to receive data provided by the requesting member to impact the risk level rating. For example, the geolocation-based funding system may be structured to retrievably store device-related information (e.g., IP address, device identifier) and cause the client application on the requesting member device to include the device-related information in an electronic message that comprises the current location of the device.

The system may be further structured to improve technology in the field by providing privacy-preserving features for the requesting member and/or the accepting member. For example, the system may include a registry structured to prevent either member from learning of each other's identity. Further, the registry may be structured to validate a requesting member's location by receiving data from the requesting member's employer. The registry is structured to validate this data against third party sources (e.g., validate the address provided by the employer against the registration of the requesting member's vehicle by searching the records of the Department of Motor Vehicles (DMV)). The registry may also validate the current location of the requesting member through the third party sources (e.g., utilizing city cameras that may register the driver's license plate number for the requesting member to determine the requesting member's current location).

The embodiments of the geolocation-based funding system may utilize geolocation to determine a location of a requesting member and the location of other members of the business syndicate. Technology in the field is improved by a sensor and data feed architecture that uses additional information to supplement geolocation information provided by individuals (e.g., when registering with the system) and/or their computing devices (e.g., via a GPS system). For example, this information may be supplemented by determining an individual's vehicle registration information and cross-referencing the individual-provided or GPS-provided location information to vehicle identifying information received via municipal data feeds. Further, and more generally, the utilization of the geolocation improves computer technology in that it provides an additional parameter for the geolocation-based funding system for selecting and matching requesting members and by providing the selected members additional local disaster and economic information regarding relative to the location of the requesting member. For example, in some embodiments, a provider institution computing system may generate (or cause a remote computing system to generate and transmit to the provider institution computing system) a local disaster data set and local economic data set associated with a requesting member by using the location of the requesting member's computing device. The provider institution computing system may then generate, or cause to be generated, a risk rating level based on the ability of the requesting member to repay the loan.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of geolocation-based funding computer system, according to an example arrangement. The geolocation-based funding system 100 may receive an electronic request for a funding request and then provide the funding request based on the information received from the electronic request. Further, the geolocation-based funding system 100 may be structured to use the provider information to generate data sets. The geolocation-based funding system 100 may be structured to select from members of the business syndicate based on the generated data sets and to provide the selected member an opportunity to accept the funding request.

A business syndicate may include a plurality of groups of members (individuals or businesses), where each group of members are locally connected to each other (i.e. members that are within a predetermined geographical distance of one another, such as under 10 miles, 50 miles, 100 miles, 250 miles, within the same district or county, within a particular epidemiological region as defined by local health authorities and determined based on a data item in the relevant data feed, etc.). The business syndicate may be a formal organization which includes members responsible for managing and maintaining the business syndicate. In some embodiments, the business syndicate is an informal organization of members with an agreement to provide support to one another. The members of the business syndicate may pay a periodic fee to remain in the business syndicate. The members of the business syndicate may share resources (e.g., equipment, staff, and funds) with other members of the business syndicate. The members of the business syndicate may also have agreements in place to utilize the services of other members of the business syndicate prior to utilizing the services of businesses outside of the business syndicate. The business syndicate may determine the members that may utilize the systems described herein.

A member of the business syndicate may be an individual or a business that provides and/or receives resources to and from the business syndicate. In some embodiments, the member pays a periodic fee to remain a member of the business syndicate. The member at times may require additional funds for their personal needs (e.g., pay their bills) or to operate their business. The member at times may have additional funds that may be available to lend to other members of the business syndicate. The member may utilize the systems described herein to request and/or provide funds to other members of the business syndicate for their personal needs or to more efficiently run their business.

An administrator may be an employer of a member of the business syndicate requesting funds. The administrator can provide information to the business syndicate regarding the member including, but not limited to, past income, current income, current working schedule, employee address, and, if applicable, the reason for a reduction in income.

A third party may be any information source that provides relevant information utilized by the geolocation-based funding system 100. The third party may be a local municipal computing system or a website that provides information related to the current location and/or the residence of the members. For example, a local municipal website may provide information related to epidemiological statistics in the area that the member resides in. The third party may also be a business networking platform that provides information related to the member. For example, the business networking platform may provide information related to the skill set of the member by querying the member's profile on the business networking platform. The geolocation-based funding system 100 may then determine the market demand for that member's skill set.

As shown, the geolocation-based funding system 100 may include a provider institution computing system 102, a requesting member computing device 104, an accepting member computing device 106, an administrator computing device 108, and a third party computing device 109. The provider institution computing system 102, the requesting member computing device 104, the accepting member computing device 106, the administrator computing device 108, and/or the third party computing device 109 are in communication with each other via network 110.

The provider institution computing system 102 may include a network interface 112, a processing circuit 114, an authentication circuit 116, and a geolocation-based funding application 118.

As shown, the network interface 112 is structured to establish connections with the requesting member computing device 104, the accepting member computing device 106, the administrator computing device 108, and/or the third party computing device 109 by way of the network 110. The network interface 112 includes programming and/or hardware-based components that connect the provider institution computing system 102 to the network 110. For example, the network interface 112 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface 112 includes the hardware and machine-readable media structured to support communication over multiple channels of data communication (e.g., wireless, Bluetooth, near-field communication, etc.) Further, in some arrangements, the network interface 112 includes cryptography module(s) to establish a secure communication session (e.g., using the IPSec protocol or similar) in which data communicated over the session is encrypted and securely transmitted. To support the features of the provider institution computing system 102, the network interface 112 provides a relatively high-speed link to the network 110, which may be any combination of a local area network (LAN), an intranet (e.g., a private banking or retailer network), the Internet, or any other suitable communications network, directly or through another interface.

The processing circuit 114, as shown, comprises a processor 122 and a memory 124. The memory 124 includes one or more memory devices (e.g., RAM, NVRAM, ROM, Flash Memory, hard disk storage) that store data and/or computer code for facilitating the various processes described herein. That is, in operation and use, the memory 124 stores at least portions of instructions and data for execution by the processor 122 to control the processing circuit 114. The memory 124 may be or include tangible, non-transient volatile memory and/or non-volatile memory. The processor 122 may be implemented as a general-purpose processor, an application specific integrated circuit (ASIC), one or more field programmable gate arrays (FPGAs), a digital signal processor (DSP), a group of processing components, or other suitable electronic processing components.

Before receiving a request, the requesting member computing device 104, the accepting member computing device 106, and/or the administrator computing device 108 may be authenticated. The authentication process may include the user completing an authentication process on the requesting member computing device 104, the accepting member computing device 106, and/or the administrator computing device 108 by providing a PIN, passcode, biometric data, etc. and causing the computing device to transmit this authentication information to the authentication circuit 116.

The provider institution computing system 102, as shown, is structured to run a variety of application programs and store associated data in a database of the memory 124. One such application may be the geolocation-based funding application 118. The geolocation-based funding application 118 includes computer-executable code stored in the memory 124. The geolocation-based funding application 118 may be structured to receive electronic requests from the requesting member computing device 104 to create funding requests. The geolocation-based funding application 118 may also be structured to select from other (i.e. non-requestor) members of the business syndicate according to information received relating to the other members of the business syndicate and transmit, to the devices associated with the selected members, an electronic notification of an opportunity to accept the funding request. According to various embodiments, the notification may include a push alert, a text message, and/or an email message. The notification may be transmitted to the accepting member computing devices via the network 110.

The geolocation-based funding application 118 may include an employee data validator circuit 120. In some embodiments, the provider institution computing system 102 may be structured to receive data from the administrator computing device 108 before submitting the funding request. The employee data validator circuit 120 may then be structured to implement privacy-preserving and/or location identification features for the requesting member and/or the accepting member. The employee data validator circuit 120 is structured to prevent either member (i.e. counterparties to a transaction) from learning of each other's identity. Further, the employee data validator circuit 120 may be structured to validate a requesting member's location information by receiving data. The employee data validator circuit 120 is further structured to validate this data against third party sources. For example, the employee data validator circuit can validate the address provided by the administrator computing device 108 against the registration of the requesting member's vehicle by requesting records from the Department of Motor Vehicles (DMV) and receiving an electronic data feed or submission in response. The electronic data feed or submission may include at least an employee name, an employee identifier (e.g., an SSN, a TIN, a driver's license number), and a license p late number for a vehicle registered to the employee. The employee data validator circuit 120 may also validate the current location of the requesting member through the third party sources (e.g., by utilizing city cameras that register the driver's license plate number for the requesting member to determine the requesting member's current location). For example, the employee data validator circuit 120 may receive a data feed comprising the license plate number for a vehicle registered to the employee. The data feed may be provided by a municipal computing system and may include the license plate number, a date/time stamp, geographical coordinates for a particular geographical location, a location identifier (intersection of streets, zip, municipality, county, etc.), a copy of an image file showing a picture of the vehicle, etc. The employee data validator circuit 120 may cross-reference the license plate information against an employee database (e.g., member database 126) and, based on the cross-referencing, determine the employee identifier and employee identity. This information can be used to supplement geolocation information to more accurately determine the location of a particular individual. In some arrangements, this information may be used in combination with local disaster or epidemiological data to determine which regions are likely to experience an economic downturn (e.g., by projecting a percentage of active cases of a particular disease and projecting a timeline for related business closures). Accordingly, the region and projection data can be used in combination with geolocation data to pre-qualify individuals for loans (e.g., by generating a data set of members that are likely to need a loan and/or by generating electronic notifications to these members.)

The geolocation-based funding application 118 may include a disaster funding modeler circuit 121. In some embodiments, the provider institution computing system 102 may be structured to receive data (e.g., through web crawling, through receiving data via APIs) from third party computing devices. These third party computing devices may include news sources, local municipality devices, county computing devices, local health authority computing devices and/or medical databases related to the current and/or permanent location of the requesting member received by the employee data validator circuit 120. The disaster funding modeler circuit 121 is further structured to determine if a disaster is occurring or is likely to occur in a particular location. For example, if the disaster funding modeler circuit 121 determines that hospitals are currently beyond capacity, the disaster funding modeler circuit 121 may then determine that there may be an economic slowdown in that area. Further, the disaster funding modeler circuit 121 is structured to determine if a disaster is imminent. For example, the disaster funding modeler circuit 121 may receive epidemiological data that COVID-19 is on the rise in an area. The disaster funding modeler circuit 121 may then predict that restaurants in that area may be closing soon due to the rise of COVID-19.

The provider institution computing system 102 may also include a member database 126, a loan database 128, and a third party account database 130. If the provider institution computing system 102 receives an electronic request from the requesting member computing device 104, the electronic request may include a first data set. The provider institution computing system 102 may use the first data set to generate various data sets. The various data sets may include, but is not limited to, the requesting member's name, requested loan amount, requesting loan terms, past loan repayments, and the reason(s) for requesting the loans. In some embodiments, this information is generated as a suggestion to a member pre-qualified for a loan, as described above. The provider institution computing system 102 may store the various data sets in the member database 126. The provider institution computing system 102 may also utilize the various data sets to generate a requesting member data set. The requesting member data set may be any information related to the requesting member and the funding request.

Utilizing the employee data validator circuit 120 and the disaster funding modeler circuit 121, the provider institution computing system 102 receives a second data set and a third data set. The second data set comprises disaster and economic data for the requesting member. The third data set comprises disaster and economic data for other members of the business syndicate. The provider institution computing system 102 may store the second data set and the third data set in the member database 126.

Utilizing the second data set, the provider institution computing system 102 generates a requesting member local disaster data set and a requesting member local economy data set. Utilizing the requesting member data set, the requesting member local disaster data set and the requesting member local economy data set, the provider institution computing system 102 generates a requesting member risk rating. The requesting member risk rating provides other members of the business syndicate the calculated risk level reflective to a probability (e.g., expressed in percentage terms) that the requesting member will be able to repay a loan in a particular amount. Further, the requesting member risk rating may be utilized to determine a repayment amount premium. The repayment amount premium may affect the terms of the loan repayment. For example, if a requesting member has a high requesting member risk level rating, the loan may incorporate a higher interest rate and a longer repayment schedule. Accordingly, if the requesting member has a low requesting member risk level rating, the loan may incorporate a lower interest rate and a shorter repayment schedule.

Utilizing the third data set, the provider institution computing system 102 generates a member local disaster data set and a member local economy data set. Utilizing the member local disaster data set and the member local economy data set, the provider institution computing system 102 generates a member risk rating for each of the remaining members of the business syndicate. The provider institution computing system 102 utilizes the member risk rating of each of the remaining members of the business syndicate to select members who have been determined and/or predicted to have a low member risk rating. In this manner, the geolocation-based funding system 100 is able to match requesting members to other members that are not impacted by any and/or the same economic and/or disaster related occurrences.

The provider institution computing system 102 may select members that have the lowest member risk rating (e.g., members who are associated with a higher probability of repayment score) to minimize the chance these members are impacted in the future by economic and/or disaster related occurrences. In another exemplary embodiment, the provider institution computing system 102 may prioritize members that have a lower member risk rating, but are located closest to the requesting member. In this manner, the members have an incentive to support their neighboring cities and/or counties.

After selecting from the members of the business syndicate, the provider institution computing system 102 may transmit a first electronic notification to the members of the business syndicate. According to various embodiments, the first electronic notification may include a push alert, a text message, and/or an email message. The first electronic notification may be transmitted to the accepting member computing device 106 of each of the members via the network 110. The first electronic notification may include a portion of the requesting member data set, the requesting member local disaster data set, the requesting member local economy data set, and the requesting member risk level rating. The users of the accepting member computing device 106 may then accept or reject the funding request. In another exemplary embodiment, the users of the accepting member computing device 106 may specify the terms of the loan. The accepting member computing device 106 then transmits the response to the provider institution computing system 102.

The provider institution computing system 102 may then transmit the information from the members that accepted the funding request to the requesting member computing device 104. The user of the requesting member computing device 104 may then select which party to accept the loan from. In an exemplary embodiment, the requesting member is not given identification information of the accepting member. In another exemplary embodiment, the requesting member is given information regarding the city or other geolocation information of the accepting member and the loan terms. In yet another exemplary embodiment, the requesting member may counter the loan terms to the accepting member and/or agree to provide and receive the identification of the requesting member and the accepting member.

The requesting member computing device 104 transmits the response to the provider institution computing system 102. After receiving the response from the requesting member computing device 104, the provider institution computing system 102 may transmit a second electronic notification to the remaining members of the business syndicate. According to various embodiments, the second electronic notification may include a push alert, a text message, and/or an email message. The second electronic notification may include whether the member's loan acceptance has been chosen or not. If chosen, the second electronic notification may provide additional instructions to the user of the accepting member computing device 106 by the provider institution computing system 102. These instructions including how and when by to deposit funds.

After receiving the funds by the user of the accepting member computing device 106, the provider institution computing system 102 generates an electronic contract. The electronic contract includes the loan terms, repayment plan, potential fees, and provisions for canceling the contract and/or if performance of the contract is not met. The provider institution computing system 102 transmits the electronic contract to both parties for their signatures. After receiving signatures by both parties, the provider institution computing system transmits the funds to a financial account associated with the user of the requesting member computing device 104. If the electronic contract is not signed by both parties by a specified period or is contested by either party, the provider institution computing system 102 voids the electronic contract and transmits the funds back to a financial account associated with the user of the accepting member computing device 106.

The provider institution computing system 102 then monitors repayment performance of the requesting member based on the term of the electronic contract. The electronic contract may be a self-executing contract. For example, if the requesting member is late on a payment, the electronic contract may automatically include a late fee for that monthly payment. Further, if the requesting member is not performing the repayment of the contract, the provider institution computing system 102 may be structured to notify an executive member of the business syndicate. Further, the requesting member risk level rating of the requesting member will be impacted by the repayment performance. For example, if the requesting member completes all payment on time or pays the loan early, the requesting member risk level rating will decrease.

In some embodiments, monitoring repayment performance of the requesting member may include periodically receiving from a third party computing system (e.g., the third party account database 130) data feeds regarding account activity of the requesting member. In some embodiments, the disaster fund modeler 121 may be structured to access the member database 126 and/or loan database 128 to and generate a data set comprising members with active loans. The data set may include member/employee identifying information, current location information, which may be supplemented with data from municipal data feeds as described above, etc. The disaster fund modeler 121 may further use external data sets as described above to generate a projection of a likelihood of economic conditions worsening in a locality corresponding to the current location information (e.g., by determining a locality, such as a district, city, county, state, etc. based on the location information and then applying external data set data for the locality). In some embodiments, the repayment amounts may be adjusted based on the projected information (e.g., if a locality is likely to experience a disaster, the repayment amount(s) can be reduced by a corresponding number of percentage points). The projected information can further be based on determining whether a particular locality is under a stay-at-home order, whether an employee is considered essential, whether the relevant businesses are closed and not hiring, etc. If a periodic funds transfer is scheduled pursuant to an electronic contract, the amount of the periodic transfer may be adjusted accordingly. Accordingly, improvement in the technology of income-sensitive repayment management is achieved.

Figure 2:
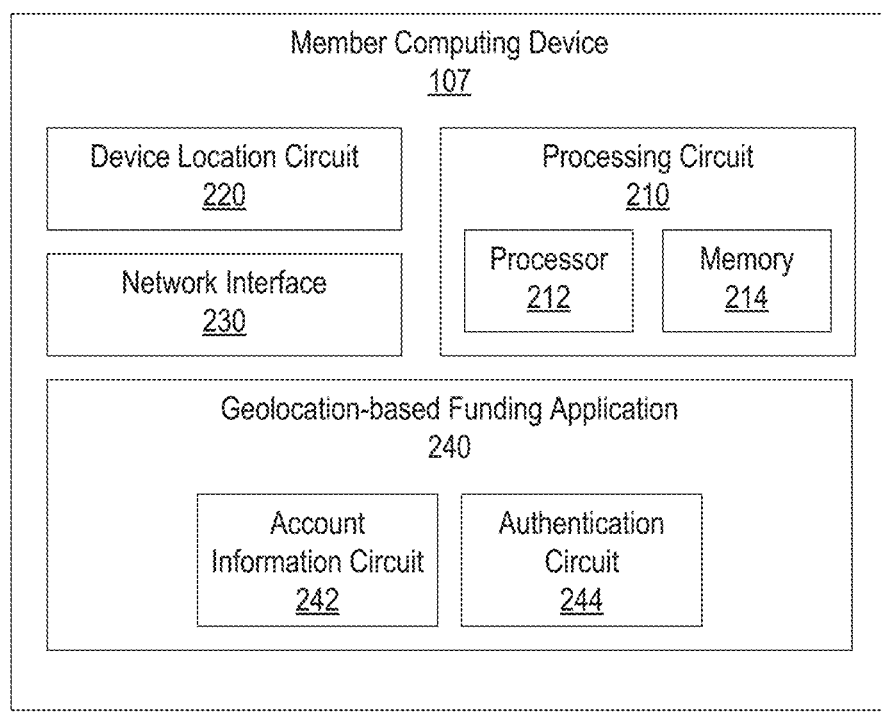
FIG. 2 is a component diagram of a member computing device, according to an example arrangement.

FIG. 2 is a component diagram of a member computing device 107, according to an example arrangement. The member computing device 107 may be the requesting member computing device 104 or the accepting member computing device 106. The member computing device 107 includes a processing circuit 210, a device location circuit 220, a network interface 230, and a geolocation-based funding application 240. The processing circuit 210 as shown, comprises a processor 212 and a memory 214. The memory 214 includes one or more memory devices (e.g., RAM, NVRAM, ROM, Flash Memory, hard disk storage) that store data and/or computer code for facilitating the various processes described herein. That is, in operation and use, the memory 214 stores at least portions of instructions and data for execution by the processor 212 to control the processing circuit 210. The memory 214 may be or include tangible, non-transient volatile memory and/or non-volatile memory. The processor 212 may be implemented as a general-purpose processor, an application specific integrated circuit (ASIC), one or more field programmable gate arrays (FPGAs), a digital signal processor (DSP), a group of processing components, or other suitable electronic processing components.

The device location circuit 220 is structured to determine the location of the member computing device 107 and provide the location of the member computing device 107 to other entities (e.g., the provider institution computing system 102) via the network interface 230. The device location circuit 220 determines the location of the member computing device 107 based on the Global Positioning System ("GPS") coordinates of the member computing device 107. The device location circuit 220 may be a GPS receiver. In some arrangements, the device location circuit 220 may be in communication with a GPS receiver of the requesting member computing device 104. The device location circuit 220 may determine the GPS location of the requesting member computing device 104 based on GPS signals received from GPS satellites.

The network interface 230 is configured for and structured to communicate data over the network 110. For example, the network interface 230 is configured for and structured to send and receive information related to a job initiated by the subscriber. Accordingly, the network interface 230 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The geolocation-based funding application 240 is circuitry that may be structured to run on a mobile device or other computing device (e.g., the member computing device 107). The geolocation-based funding application 240 is structured to provide data for the geolocation-based funding system 100, receive information related to a funding request, and to provide a response to accepting and/or submitting funds request. The geolocation-based funding application 240 includes an account information circuit 242 and an authentication circuit 244.

The account information circuit 242 is structured to access information regarding the information of the user of the member computing device 107 to the provider institution computing system 102. For example, the account information circuit 242 communicates with the provider institution computing system 102 to provide the identification of the member.

The authentication circuit 244 is structured to receive an authentication code from the provider institution computing system 102 and provide the authentication code for verification of the member. In arrangements where the authentication code is encrypted, the authentication circuit 244 is structured to decrypt the authentication code when providing the authentication code for verification purposes. In some arrangements, the authentication circuit 244 is structured to transmit device information to the provider institution computing system 102.

Figure 3:
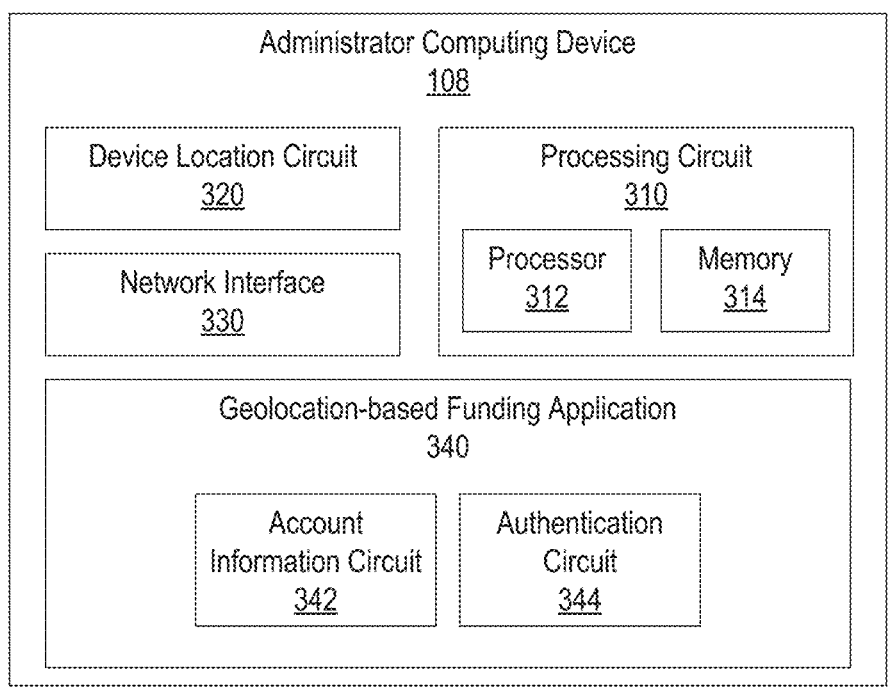
FIG. 3 is a component diagram of an administrator computing device, according to an example embodiment.

FIG. 3 is a component diagram of the administrator computing device 108, according to an example arrangement. The administrator computing device 108 may be the employee of the requesting member computing device 104. The administrator computing device 108 includes a processing circuit 310, a device location circuit 320, a network interface 330, and a geolocation-based funding application 340. The processing circuit 310 as shown, comprises a processor 312 and a memory 314. The memory 314 includes one or more memory devices (e.g., RAM, NVRAM, ROM, Flash Memory, hard disk storage) that store data and/or computer code for facilitating the various processes described herein. That is, in operation and use, the memory 314 stores at least portions of instructions and data for execution by the processor 312 to control the processing circuit 310. The memory 314 may be or include tangible, non-transient volatile memory and/or non-volatile memory. The processor 312 may be implemented as a general-purpose processor, an application specific integrated circuit (ASIC), one or more field programmable gate arrays (FPGAs), a digital signal processor (DSP), a group of processing components, or other suitable electronic processing components.

The device location circuit 320 is structured to determine the location of the administrator computing device 108 and provide the location of the administrator computing device 108 to other entities (e.g., the provider institution computing system 102) via the network interface 330. The device location circuit 320 determines the location of the administrator computing device 108 based on the Global Positioning System ("GPS") coordinates of administrator computing device 108. The device location circuit 320 may be a GPS receiver. In some arrangements, the device location circuit 320 may be in communication with a GPS receiver of the administrator computing device 108. The device location circuit 320 may determine the GPS location of the administrator computing device 108 based on GPS signals received from GPS satellites.

The network interface 330 is configured for and structured to communicate data over the network 110. For example, the network interface 330 is configured for and structured to send and receive information related to a job initiated by the subscriber. Accordingly, the network interface 330 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The geolocation-based funding application 440 is circuitry that may be structured to run on a mobile device or other computing device (e.g., the administrator computing device 108). The geolocation-based funding application 340 is structured to provide data for the geolocation-based funding system 100, receive information related to a funding request, and to provide information related to the requesting member. The geolocation-based funding application 340 includes an account information circuit 342 and an authentication circuit 344.

The account information circuit 342 is structured to access information regarding the information of the user of the administrator computing device 108 to the provider institution computing system 102. For example, the account information circuit 342 communicates with the provider institution computing system 102 to provide the identification of the administrator.

The authentication circuit 344 is structured to receive an authentication code from the provider institution computing system 102 and provide the authentication code for verification of the administrator. In arrangements where the authentication code is encrypted, the authentication circuit 344 is structured to decrypt the authentication code when providing the authentication code for verification purposes. In some arrangements, the authentication circuit 344 is structured to transmit device information to the provider institution computing system 102.

Figure 4:
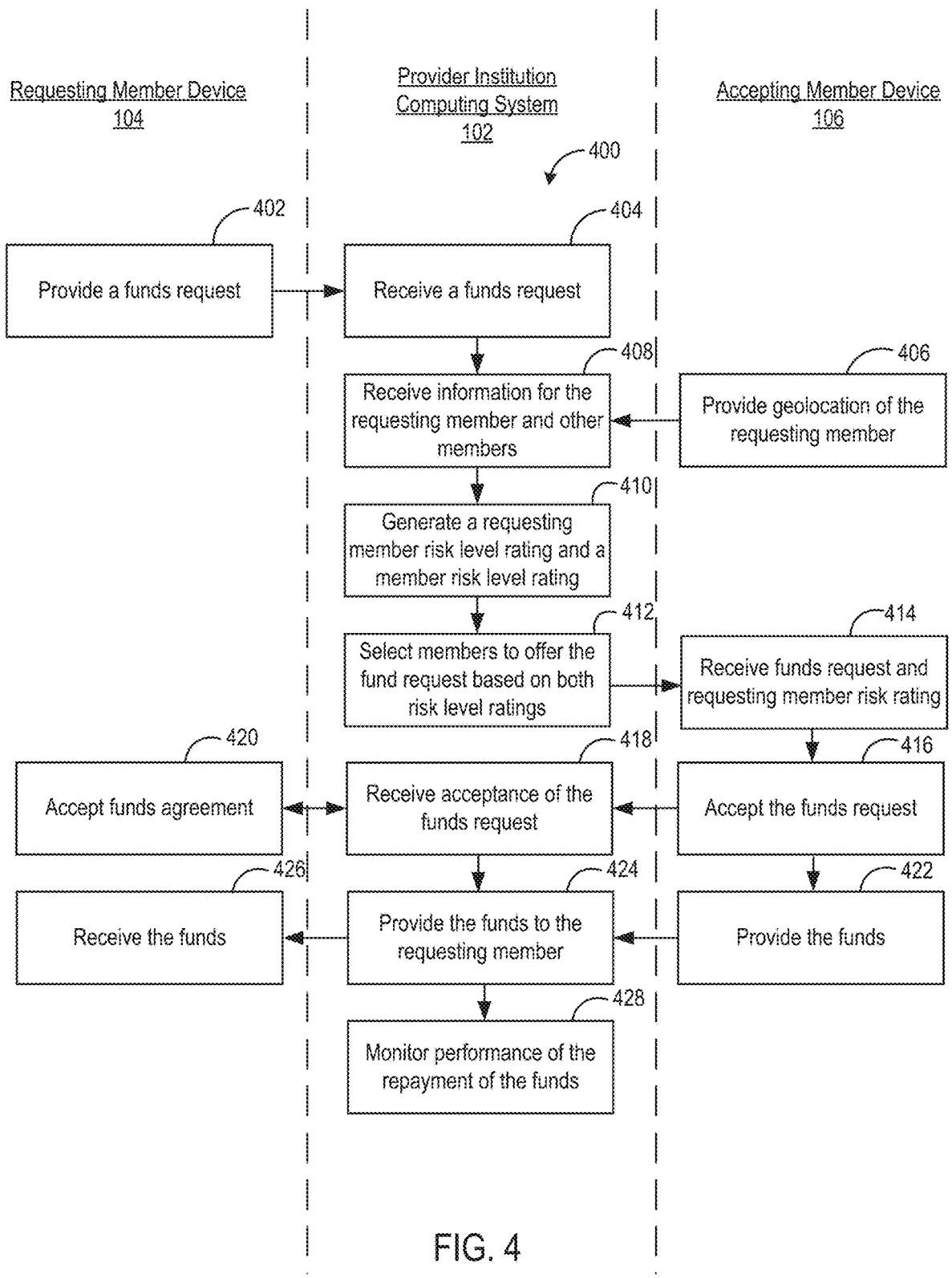
FIG. 4 is a flow diagram of a method executed by the geolocation-based funding system, according to an example arrangement.

FIG. 4 is a flow diagram of a method 400 executed by the geolocation-based funding system, according to an example arrangement. Operations of the method 400 may be conducted by the geolocation-based funding system 100 (e.g., provider institution computing system 102, requesting member computing device 104, and accepting member computing device 106). Through operations of the method 400, the provider institution computing system 102 receives an electronic request from the requesting member computing device 104, generates various data sets by receiving local disaster and economic data related to the requesting member, receiving local disaster and economic data related to the others member of the business syndicate, matching the requesting member to the other members based on risk level rating, and by presenting the loan request to the matched members.

As shown, the method 400 begins by the user of the requesting member computing device 104 transmitting to the provider institution computing system 102, an electronic request for funds, at step 402. The electronic request includes a first data set. In some embodiments, the requesting member initiates the process of requesting funds by entering the relevant data using a user-interactive GUI rendered on the member computing device 107 by the geolocation-based funding application 240. In some embodiments, the disaster fund modeler circuit 121 generates a notification transmitted to the member computing device 107. The electronic notification may include a suggestion to request funding. The suggestion may be generated based at least in part on determining a location of the member (based on member-entered data provided by the member, GPS data provided by the member computing device 107 and/or supplemental location data as determined by, for example, using a municipality traffic data feed and cross-referencing license plate information to member information). The location of the member may serve as a basis for determining a geographical locality. Data for the geographical locality can then be used to generate a projection of a likelihood of worsening economic conditions. If the likelihood meets a predetermined threshold, the electronic notification may be generated for the members in the location.

The provider institution computing system 102 receives the electronic request at 404. The provider institution computing system 102 may use the first data set to generate various data sets. The various data sets may include, but is not limited to, the requesting member's name, requested loan amount, requesting loan terms, past loan repayments, and the reason(s) for requesting the loans. The provider institution computing system 102 may also receive a second data set related to the user of the requesting member computing device 104 by the administrator computing device 108 and/or the third party computing device 109, at step 408. The provider institution computing system 102 utilizes the second data set to generate a requesting member local disaster data set and a requesting member local economy data set.

The provider institution computing system 102 also receives a third data set (step 408) from each of the members of the business syndicate/step 406. The provider institution computing system 102 utilizes the third data set to generate a member local disaster data set and a member local economy data set. The third data set may also be received (as a portion or as a whole) the administrator computing device 108 and/or the third party computing device 109.

Utilizing the various generated data sets, the provider institution computing system 102 then generates a requesting member risk level rating for the requesting member and a member risk level rating for each of the members of the business syndicate at step 410.

Utilizing the requesting member risk level rating and the member risk level rating, the provider institution computing system 102 matches a requesting member to other members at step 410. The provider institution computing system 102 may select members that have the lowest member risk rating to minimize the chance these members are impacted in the future by economic and/or disaster related occurrences, at step 412. In another exemplary embodiment, the provider institution computing system 102 may prioritize members that have a lower member risk rating, but are located closest to the requesting member. In this manner, the members have an incentive to support their neighboring cities and/or counties.

After selecting from the members of the business syndicate, the provider institution computing system 102 transmits a first electronic notification to the members of the business syndicate, at step 414. The first electronic notification may include a portion of the requesting member data set, the requesting member local disaster data set, the requesting member local economy data set, and the requesting member risk level rating.

The users of the accepting member computing device 106 may then accept or reject the funding request, at step 416. In another exemplary embodiment, the users of the accepting member computing device 106 may specify the terms of the loan. The accepting member computing device 106 then transmits the response to the provider institution computing system 102.

The provider institution computing system 102 may then receive the information from the members that accepted the funding request, at step 418. The provider institution computing system 102 may again remove users based on the requested loan terms and/or distance to the requesting member. The provider institution computing system 102 then transmits the loan terms from the members to the requesting member computing device 104.

The user of the requesting member computing device 104 may then select which party to accept the loan from, at step 420. In an exemplary embodiment, the requesting member is not given identification information of the accepting member. In another exemplary embodiment, the requesting member is given information regarding the city of the accepting member and the loan terms. In yet another exemplary embodiment, the requesting member may counter the loan terms to the accepting member and/or agree to provide and receive the identification of the requesting member and the accepting member. The provider institution computing system 102 provides the user of the accepting member computing device 106 a notification that they have accepted.

The accepting member computing device 106 then provides the funds to the provider institution computing system 102, at step 422. After receiving the funds by the user of the accepting member computing device 106, the provider institution computing system 102 generates an electronic contract. The electronic contract includes the loan terms, repayment plan, potential fees, and provisions for canceling the contract and/or if performance of the contract is not met. The provider institution computing system 102 transmits the electronic contract to both parties for their signatures.

After receiving signatures by both parties, the provider institution computing system transmits the funds to a financial account associated with the user of the requesting member computing device 104, at step 424. If the electronic contract is not signed by both parties by a specified period or is contested by either party, the provider institution computing system 102 voids the electronic contract and transmits the funds back to a financial account associated with the user of the accepting member computing device 106. The requesting member computing device 104 receives the funds, at step 426.

The provider institution computing system 102 then monitors repayment performance of the requesting member based on the term of the electronic contract, at step 428. The electronic contract may be a self-executing contract. For example, if the requesting member is late on a payment, the electronic contract may automatically include a late fee for that monthly payment. Further, if the requesting member is not performing the repayment of the contract, the provider institution computing system 102 may be structured to notify an executive member of the business syndicate. Further, the requesting member risk level rating of the requesting member will be impacted by the repayment performance. For example, if the requesting member completes all payment on time or pays the loan early, the requesting member risk level rating will decrease.

Figure 5:
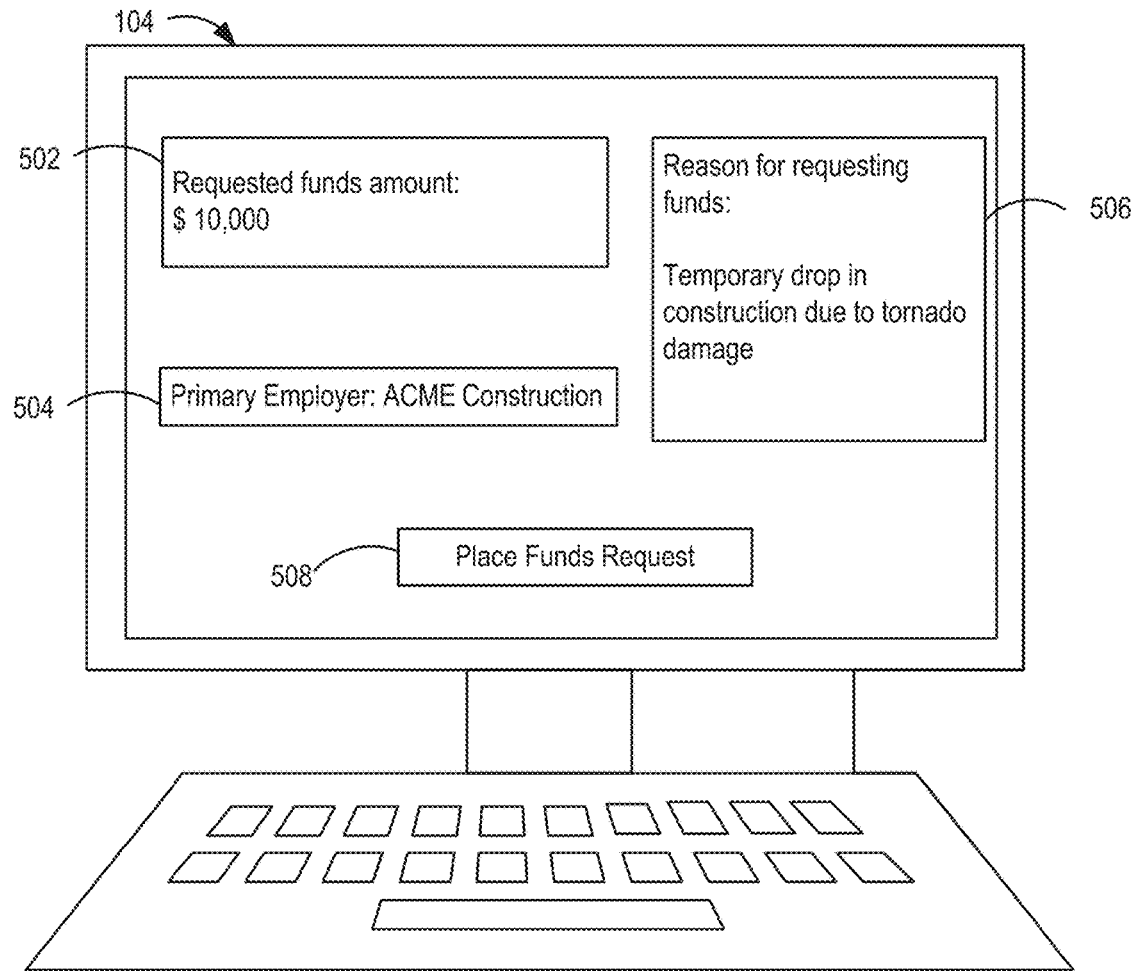
FIG. 5 is an illustration of some aspects of a user interface for creating a funding request on a requesting member computing device, according to an example arrangement.

FIG. 5 is an illustration of some aspects of a user interface for creating a funding request on a requesting member computing device 104, according to an example arrangement. The user interface may display the geolocation-based funding application 240 and/or transaction information which may be directed to requesting a loan request and/or accepting a loan request. The transactional information may include a first text control 502. The first text control 502 may allow the user of the requesting member computing device 104 to input their requested funds amount. The transactional information may also include a second text control 504. The second text control 504 allows the user to input their primary employer. The geolocation-based funding system 100 may receive additional information from the primary employer regarding the user of the requesting member computing device 104. The transactional information may also include a third text control 506. The third text control 506 allows the user to input the reason for requesting funds. The geolocation-based funding system 100 may utilize this information when generating the requesting member risk level rating. The submit control 508 allows the user of the requesting member computing device 104 to submit the funds request after inputting all of the required information.

Figure 6:
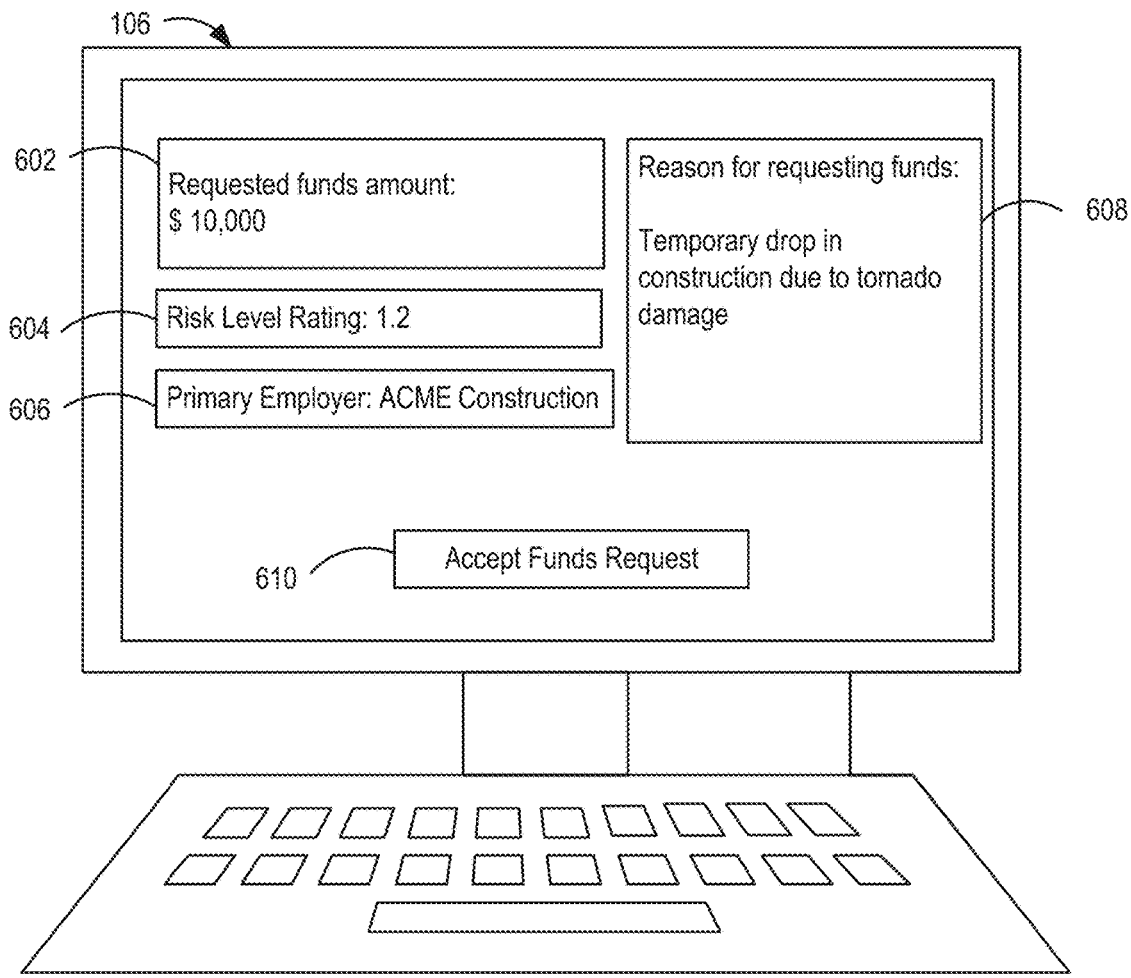
FIG. 6 is an illustration of some aspects of a user interface for accepting a funding request on an accepting member computing device, according to an example arrangement.

FIG. 6 is an illustration of some aspects of a user interface for accepting a funding request on an accepting member computing device 106, according to an example arrangement. The user interface may display the geolocation-based funding application 240 and/or transaction information which may be directed to requesting a loan request and/or accepting a loan request. The transactional information may include a first information control 602. The first information control 602 provides the user of the accepting member computing device 106 the requested funds amount. The transactional information may include a second information control 604. The second information control 604 provides the user of the accepting member computing device 106 the requesting member risk level rating generated by the geolocation-based funding system 100. The transactional information may include a third information control 606. The third information control 606 provides the user of the accepting member computing device 106 the requesting member's primary employer. The transactional information may include a fourth information control 608. The fourth information control 608 provides the user of the accepting member computing device 106 the requesting member's reason for requesting funds. The transactional information may include an accept control 610. The accept control 610 provides the user of the accepting member computing device 106 the ability to accept the funds request.

Figure 7:
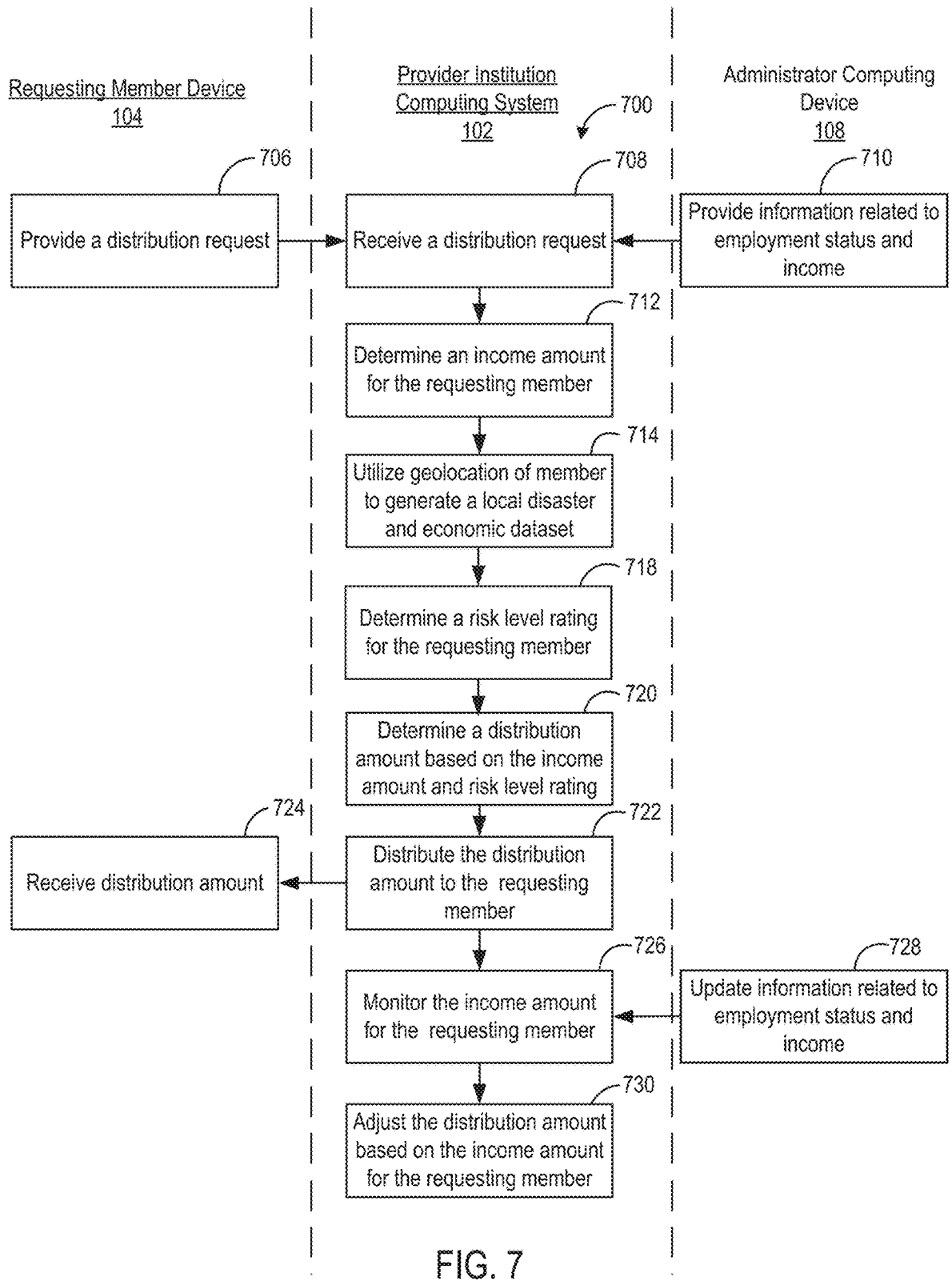
FIG. 7 is a flow diagram of a method executed by the geolocation-based funding system, according to an example arrangement.

FIG. 7 is a flow diagram of a method 700 executed by the geolocation-based funding system, according to another example arrangement. Operations of the method 700 may be conducted by the geolocation-based funding system 100 (e.g., provider institution computing system 102, requesting member computing device 104, and administrator computing device 108). Through operations of the method 700, the provider institution computing system 102 receives an electronic request from the requesting member computing device 104 for a periodic distribution, generates various data sets by receiving local disaster and economic data related to the requesting member, generate a risk level rating, and by presenting the loan request to the matched members.

As shown, the method 700 begins by the user of the requesting member computing device 104 transmitting to the provider institution computing system 102, an electronic request for a periodic distribution, at step 706. The electronic request includes a first data set. The provider institution computing system 102 receives the electronic request at 708. The provider institution computing system 102 may use the first data set to generate various data sets. The various data sets may include, but is not limited to, the requesting member's name, requested distribution amount, past contributions to the business syndicate, the current geolocation of the requesting member, and the reason(s) for requesting the periodic distribution.

The provider institution computing system 102 may also receive a second data set related to the user of the requesting member computing device 104 by the administrator computing device 108 and/or the third party computing device 109 at step 710. The second data set includes, but is not limited to, the requesting member's employment status, past income, a reason for a drop in income, and the requesting member's residence.

The provider institution computing system 102 may also utilize the second data set to generate an income amount for the requesting member, at step 712. The income amount may be calculated by determining the average income of the requesting member in the past.

Utilizing the second data set, the provider institution computing system 102 generates a local disaster data set and an economic data set for the requesting member, at step 714. Utilizing the local disaster data set and the economic data set for the requesting member, the provider institution computing system 102 then generates a requesting member risk level rating for the requesting member at step 718.

The provider institution computing system 102 utilizes the income amount and the risk level rating to determine a distribution amount at 720. The distribution amount may be the difference between the current income of the requesting member and the average past income. In another embodiment, the distribution amount may be more heavily influenced by the past contributions the requesting member has made to the business syndicate. In various embodiments, the distribution amount may fluctuate based on the funds available to the business syndicate.

The provider institution computing system 102 may then provide the periodic distribution amount to the requesting member, at step 722. The requesting member may receive that periodic distribution amount, at step 724. During the distribution period, the provider institution computing system 102 monitors the income amount for the requesting member at step 726. The provider institution computing system 102 may receive income information from the administrator computing device 108, at step 728, or by monitoring the financial accounts associated with the requesting member. When the provider institution computing system 102 registers a change in the income amount, the provider institution computing system 102 adjusts the distribution amount, at step 730.

Figure 8:
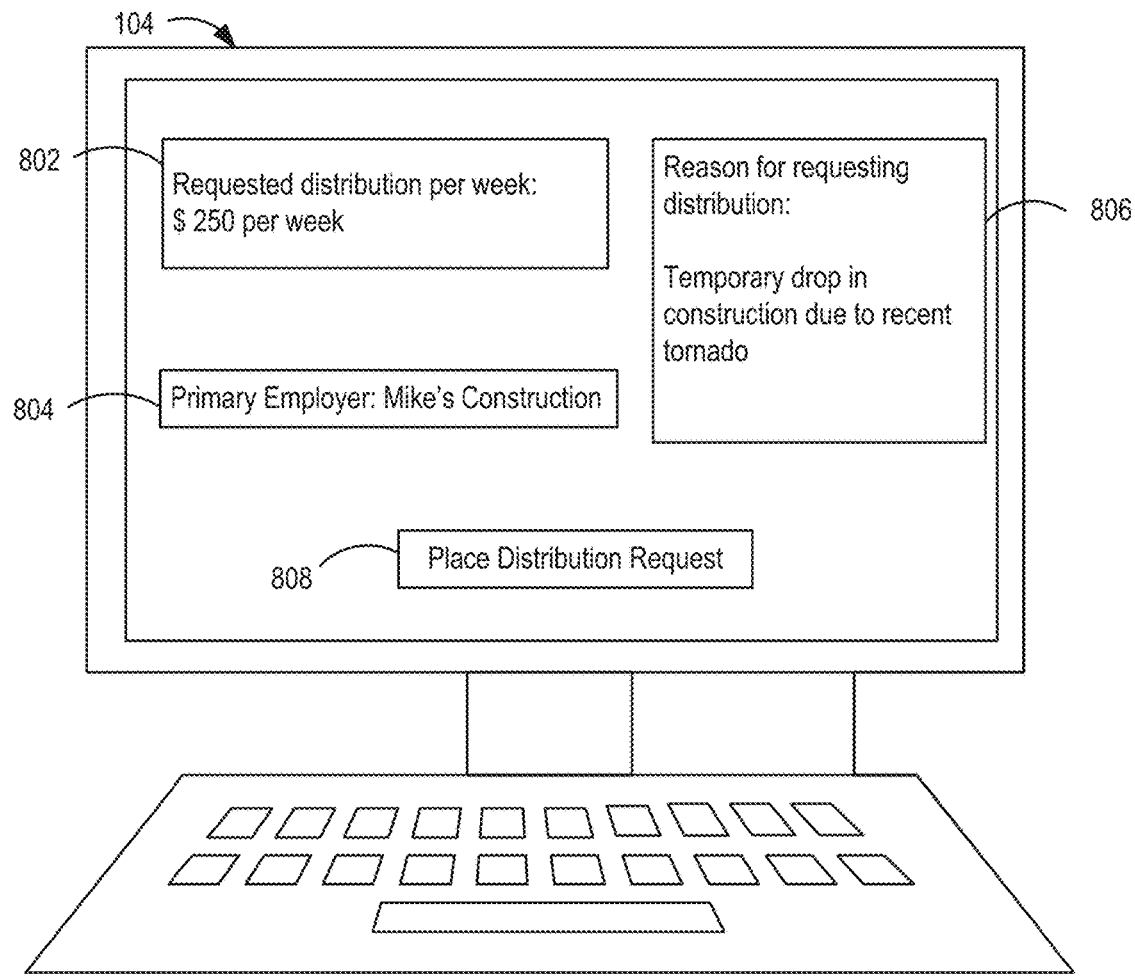
FIG. 8 is an illustration of some aspects of a user interface for creating a funds distribution request on a requesting member computing device.

FIG. 8 is an illustration of some aspects of a user interface for creating a funds distribution request on a requesting member computing device. The user interface may display the geolocation-based funding application 240 and/or transaction information which may be directed to a displayable user-interactive interface for requesting a distribution. The transactional information may include a first input control 802. The first input control 802 may allow the user of the requesting member computing device 104 to input their requested distribution amount. The transactional information may also include a second input control 804. The second input control 804 allows the user to input their primary employer. The geolocation-based funding system 100 may receive additional information from the primary employer regarding the user of the requesting member computing device 104. The transactional information may also include a third input control 806. The third input control 806 allows the user to input the reason for requesting a distribution. The geolocation-based funding system 100 may utilize this information when generating the requesting member risk level rating. The distribution submit control 808 allows the user of the requesting member computing device 104 to submit the distribution request after inputting all of the required information.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system for providing a loan to members of a business syndicate comprising:
   a requesting member computing device associated with a requesting member;
   a provider computing system comprising a network interface, a disaster funding modeler circuit, and a processing circuit, the network interface structured to facilitate data communication with the requesting member computing device via a network, the processing circuit comprising a processor and a memory, the processing circuit structured to:
   receive an electronic request from the requesting member computing device, the electronic request comprising a requesting member data set related to the loan;
   receive a location of the requesting member from a global positioning system receiver associated with the requesting member computing device;
   receive vehicle positioning data associated with a vehicle registered to the requesting member from a database associated with a third party entity;
   compare the vehicle positioning data with the received location of the requesting member to verify a geo-location of the requesting member;

utilizing the geolocation, query the disaster funding modeler circuit for a second data set and a third data set, the second data set comprising disaster and economy data for the geolocation, the third data set comprising disaster and economy data for the members of the business syndicate located outside of a predetermined distance from the geolocation;

based on the disaster and economy data, generate a requesting member local disaster data set and a requesting member local economy data set;

based on the requesting member data set, the requesting member local disaster data set, and the requesting member local economy data set, generate a requesting member risk rating;

based on the third data set, generate a member local disaster data set and a member local economy data set for each of the members of the business syndicate;

based on the member local disaster data set and the member local economy data set for each of the members of the business syndicate, select a plurality of prospective lender members;

transmit the electronic request, the requesting member local disaster data set, the requesting member local economy data set, and the requesting member risk rating to the plurality of prospective lender members;

receive an acceptance of the electronic request by an accepting member associated with one of the plurality of prospective lender members; and facilitate a transfer of an electronic payment from a financial account associated with the accepting member to a financial account associated with the requesting member.

2. The system of claim 1, further comprising an employee data validator circuit structured to:

receive global positioning system (GPS) coordinates associated with a member computing device;

receive vehicle positioning data comprising a license plate identifier associated with a vehicle of the member computing device;

cross-reference the license plate identifier to a member identifier to determine the member computing device;

based on the GPS coordinates and the vehicle positioning data, determine the geolocation of the requesting member;

cause the disaster funding modeler circuit to generate a projection of conditions in the geolocation of the requesting member;

based on the projection, generate and transmit, to the member computing device, an electronic notification comprising a pre-generated draft request for funds; and responsive to a user interaction, cause the member computing device to generate the electronic request based on the pre-generated draft request for funds, wherein the member computing device is the requesting member computing device.

3. The system of claim 1, the processing circuit further structured to:

determine a periodic funds transfer amount; and facilitate a periodic funds transfer corresponding to the periodic funds transfer amount from the financial account associated with the accepting member to the financial account associated with the requesting member.

4. The system of claim 3, the disaster funding modeler circuit further structured to:

determine a current geolocation of the requesting member;

receive an external data set comprising disaster or economic data related to the current geolocation of the requesting member; and based on the external data set, generate an economic projection data set for the requesting member.

5. The system of claim 4, the processing circuit further structured to:

adjust the periodic funds transfer amount based on the economic projection data set.

6. The system of claim 1, the processing circuit further structured to:

generate a repayment amount premium based on the requesting member risk rating.

7. The system of claim 1, the processing circuit further structured to:

generate a contract based on the electronic request;

transmit the contract to the requesting member;

transmit the contract to the accepting member; and monitor a repayment performance by the requesting member based on terms of the contract.

8. A method for providing a loan to members of a business syndicate comprising receiving, by a provider computing system via a network, an electronic request from a requesting member computing device associated with a requesting member, the electronic request comprising a requesting member data set related to the loan;

receiving, by the provider computing system, a location of the requesting member from a global positioning system receiver associated with the requesting member computing device;

receiving, by the provider computing system, vehicle positioning data associated with a vehicle registered to the requesting member from a database associated with a third party entity;

comparing, by the provider computing system, the vehicle positioning data with the received location of the requesting member to verify a geolocation of the requesting member;

utilizing the geolocation, querying, by the provider computing system, a disaster funding modeler circuit for a second data set and a third data set, the second data set comprising disaster and economy data for the geolocation, the third data set comprising disaster and economy data for the members of the business syndicate located outside of a predetermined distance from the geolocation;

based on the disaster and economy data, generating, by the provider computing system, a requesting member local disaster data set and a requesting member local economy data set;

based on the requesting member data set and the requesting member local disaster data set, generating, by the provider computing system, a requesting member risk rating;

based on the third data set, generating, by the provider computing system, a member local disaster data set and a member local economy data set for each of the members of the business syndicate;

based on the member local disaster data set and the member local economy data set for each of the members of the business syndicate, selecting, by the provider computing system, a plurality of prospective lender members;

transmitting, by the provider computing system via the network, the electronic request, the requesting member local economy data set, the requesting member local disaster data set, and the requesting member risk rating to the plurality of prospective lender members;

receiving, by the provider computing system via the network, an acceptance of the electronic request by an accepting member associated with one of the plurality of prospective lender members; and facilitating, by the provider computing system via the network, an electronic payment from a financial account associated with the accepting member to a financial account associated with the requesting member.

9. The method of claim 8, further comprising:

receiving, by the provider computing system via the network, global positioning system (GPS) coordinates associated with a member computing device;

receiving, by the provider computing system via the network, vehicle positioning data comprising a license plate identifier associated with a vehicle of the member computing device;

cross-referencing, by the provider computing system, the license plate identifier to a member identifier to determine the member computing device;

based on the GPS coordinates and the vehicle positioning data, determining, by the provider computing system, the geolocation of the requesting member;

causing, by the provider computing system, the disaster funding modeler circuit to generate a projection of conditions in the geolocation of the requesting member;

based on the projection, generating and transmitting, by the provider computing system via the network, to the member computing device, an electronic notification comprising a pre-generated draft request for funds; and response to a user interaction, by the provider computing system via the network, causing the member computing device to generate the electronic request based on the pre-generated draft request for funds, wherein the member computing device is the requesting member computing device.

10. The method of claim 8, further comprising:

determining, by the provider computing system, a periodic funds transfer amount; and facilitating, by the provider computing system via the network, a periodic funds transfer corresponding to the periodic funds transfer amount from the financial account associated with the accepting member to the financial account associated with the requesting member.

11. The method of claim 10, further comprising:

determining, by the provider computing system, a current geolocation of the requesting member;

receiving, by the provider computing system via the network, an external data set comprising disaster or economic data related to the current geolocation of the requesting member; and based on the external data set, generating, by the provider computing system, an economic projection data set for the requesting member.

12. The method of claim 11, further comprising adjusting, by the provider computing system, the periodic funds transfer amount based on the economic projection data set.

13. The method of claim 8, further comprising generating, by the provider computing system, a repayment amount premium based on the requesting member risk rating.

14. The method of claim 8, further comprising:

generating, by the provider computing system, a contract based on the electronic request;

transmitting, by the provider computing system via the network, the contract to the requesting member;

transmitting, by the provider computing system via the network, the contract to the accepting member; and monitoring a repayment performance by the requesting member based on terms of the contract.

15. A non-transitory computer readable medium (CRM) having computer-executable instructions embodied therein that, when executed by at least one processor of a computing system, cause the computing system to perform operations to provide a loan to members of a business syndicate, the operations comprising:

receiving an electronic request from a requesting member computing device associated with a requesting member, the electronic request comprising a requesting member data set related to the loan;

receiving a location of the requesting member from a global positioning system receiver associated with the requesting member computing device;

receiving vehicle positioning data associated with a vehicle registered to the requesting member from a database associated with a third party entity;

comparing the vehicle positioning data with the received location of the requesting member to verify a geolocation of the requesting member;

utilizing the geolocation, querying a disaster funding modeler circuit for a second data set and a third data set, the second data set comprising disaster and economy data for the geolocation, the third data set comprising disaster and economy data for the members of the business syndicate located outside of a predetermined distance from the geolocation;

based on the disaster and economy data, generating a requesting member local disaster data set and a requesting member local economy data set;

based on the requesting member data set, the requesting member local disaster data set, and the requesting member local economy data set, generating a requesting member risk rating;

based on the third data set, generating a member local disaster data set and a member local economy data set for each of the members of the business syndicate;

based on the member local disaster data set and the member local economy data set for each of the members of the business syndicate, selecting a plurality of prospective lender members;

transmitting the electronic request, the requesting member local disaster data set, the requesting member local economy data set, and the requesting member risk rating to the plurality of prospective lender members;

receiving an acceptance of the electronic request by an accepting member associated with one of the plurality of prospective lender members; and facilitating a transfer of an electronic payment from a financial account associated with the accepting member to a financial account associated with the requesting member.

16. The CRM of claim 15, further comprising:

receiving, by an employee data validator circuit, global positioning system (GPS) coordinates associated with a member computing device;

receiving, by the employee data validator circuit, vehicle positioning data comprising a license plate identifier associated with a vehicle of the member computing device;

cross-referencing, by the employee data validator circuit, the license plate identifier to a member identifier to determine the member computing device;

based on the GPS coordinates and the vehicle positioning data, determining, by the employee data validator circuit, the geolocation of the requesting member;

causing, by the employee data validator circuit, the disaster funding modeler circuit to generate a projection of conditions in the geolocation of the requesting member;

based on the projection, generating and transmitting, by the employee data validator circuit, to the member computing device, an electronic notification comprising a pre-generated draft request for funds; and responsive to a user interaction, causing, by the employee data validator circuit, the member computing device to generate the electronic request based on the pre-generated draft request for funds, wherein the member computing device is the requesting member computing device.

17. The CRM of claim 15, further comprising:
determining a periodic funds transfer amount; and
facilitating a periodic funds transfer corresponding to the periodic funds transfer amount from the financial account associated with the accepting member to the financial account associated with the requesting member.

18. The CRM of claim 17, further comprising:
determining, by the disaster funding modeler circuit, a current geolocation of the requesting member;
receiving, by the disaster funding modeler circuit, an external data set comprising disaster or economic data related to the current geolocation of the requesting member; and
based on the external data set, generating, by the disaster funding modeler circuit, an economic projection data set for the requesting member.

19. The CRM of claim 18, further comprising:
adjusting the periodic funds transfer amount based on the economic projection data set.

20. The CRM of claim 15, further comprising:
generating a repayment amount premium based on the requesting member risk rating.

\* \* \* \* \*